United States Patent [19]

Mitsuka

[11] Patent Number: 4,593,377
[45] Date of Patent: Jun. 3, 1986

[54] HIGH-SPEED PROCESSING METHOD OF LINE SEGMENT COORDINATES

[75] Inventor: Ikuo Mitsuka, Kusatsu, Japan

[73] Assignee: Dainippon Screen Seizo Kabushiki Kaisha, Kyoto, Japan

[21] Appl. No.: 575,222

[22] Filed: Jan. 30, 1984

[30] Foreign Application Priority Data

Feb. 7, 1983 [JP] Japan .................................. 58-17394

[51] Int. Cl.[4] .............................................. G06F 1/00
[52] U.S. Cl. .................................................... 364/900
[58] Field of Search ... 364/200 MS File, 900 MS File; 340/740, 739, 736, 742, 741

[56] References Cited

U.S. PATENT DOCUMENTS 4,208,723 6/1980 Lecklider ............................ 364/900

Primary Examiner—Raulfe B. Zache
Attorney, Agent, or Firm—Yuter, Rosen & Dainow

[57] ABSTRACT

To determine the coordinate values of quantized sequential dots on a line segment connecting desired two points $(x_1, y_1)$, $(x_2, y_2)$ in a two-dimensional quantized coordinate system, line segment coordinates are processed at high speed by providing counters, each of which employs one quantum unit as the reference clock signal thereof, respectively for the x-axis and y-axis, controlling reference clock signals, which are to be input to the counters, in accordance with the information on the two points $(x_1, y_1)$, $(x_2, y_2)$, and employing output values of the counters as coordinate values of the quantized sequential dots. The above method features high-speed processing operations.

3 Claims, 13 Drawing Figures

FIG. 6

| | INITIAL PULSE | AFTER N-TH CLOCK PULSE | | | |
|---|---|---|---|---|---|
| | $C_i$ / $C_c$ — OUT | N=1 | N=2 | N=3 | N=4 |
| OUTPUT VALUE OF COUNTER 3 | [xn] — $x_i$ | $x_i+1$ | $x_i+2$ | $x_i+3$ | $x_i+4$ |
| OUTPUT VALUE OF COUNTER 4 | [yn] — $y_i$ | $y_i$ | $y_i+1$ | $y_i+2$ | $y_i+3$ |
| OUTPUT VALUE OF D-FF 33 | [d2] — 0 | 3 | 2 | 1 | 0 |
| OUTPUT VALUE OF SELECTOR 27 | [d1] — 3 | 3 | 3 | 3 | 3 |
| OUTPUT VALUE OF ADDER 30 | [d3] — 3 | 6 | 5 | 4 | 3 |
| OUTPUT VALUE OF SELECTOR 28 | [d4] — 4 | 4 | 4 | 4 | 4 |
| OUTPUT OF COMPARATOR 32 | [d5] — L | H | H | H | L |
| OUTPUT OF NOT CIRCUIT 34 | [d5] — H | L | L | L | H |
| OUTPUT VALUE OF SUBTRACTER 31 | [d7] — -1 | 2 | 1 | 0 | -1 |
| SELECTING INPUT OF SELECTOR 29 | [d5] — H | L | L | L | H |
| OUTPUT OF SELECTOR 29 [d6] | $d_5$=H: 3 | 2 | | | 3 |
| | $d_5$=L: | | 1 | 0 | |
| INPUT VALUE OF D-FF 33 | [d6] — 3 | 2 | 1 | 0 | 3 |

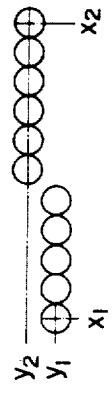

FIG. 9a

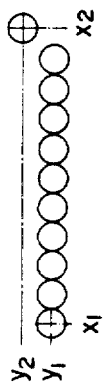

| | $C_i$ | OUT | | | | |
|---|---|---|---|---|---|---|
| | | $C_c$ | N=1 | N=2 | N=3 | N=4 |
| | INITIAL PULSE | | | | | |
| | AFTER N-TH CLOCK PULSE | | | | | |
| OUTPUT VALUE OF COUNTER 3 | $[x_n]$ | $x_i$ | $x_i+1$ | $x_i+2$ | $x_i+3$ | $x_i+4$ |
| OUTPUT VALUE OF COUNTER 4 | $[y_n]$ | $y_i$ | $y_i+1$ | $y_i+2$ | $y_i+2$ | $y_i+3$ |
| OUTPUT VALUE OF D-FF 33 | $[d_2]$ | 0 | −1 | −2 | 1 | 0 |
| OUTPUT VALUE OF SELECTOR 27 | $[d_1]$ | 3 | 3 | 3 | 3 | 3 |
| OUTPUT VALUE OF ADDER 30 | $[d_3]$ | 3 | 2 | 1 | 4 | 3 |
| OUTPUT VALUE OF SELECTOR 28 | $[d_4]$ | 4 | 4 | 4 | 4 | 4 |
| OUTPUT OF COMPARATOR 32 IF $d_3 \geq d_4$ THEN H | $[d_3 \geq d_4]$ $[d_5]$ | $3 \geq 4$ L | $2 \geq 4$ L | $1 \geq 4$ L | $4 \geq 4$ H | $3 \geq 4$ L |
| OUTPUT OF COMPARATOR 41 IF $2 \cdot d_3 \geq d_4$ THEN H | $[2 \cdot d_3 \geq d_4]$ $[d_8]$ | $6 \geq 4$ H | $4 \geq 4$ H | $2 \geq 4$ L | $8 \geq 4$ H | $6 \geq 4$ H |
| OUTPUT VALUE OF SUBTRACTER 31 | $[d_7]$ | −1 | −2 | −3 | 0 | −1 |
| OUTPUT OF AND CIRCUIT 43 | $[d_9]$ | H | H | L | L | H |
| SELECTING INPUT OF SELECTOR 29 | $[d_5]$ | L | L | H | L | L |
| OUTPUT VALUE OF SELECTOR 29 | $[d_6]$ $d_5$−H $d_5$−L | −1 | −2 | | 0 | −1 |
| INPUT VALUE OF D-FF 33 | $[d_6]$ | −1 | −2 | 1 | 0 | −1 |

HIGH-SPEED PROCESSING METHOD OF LINE SEGMENT COORDINATES

BACKGROUND OF THE INVENTION

1. Field of the Invention

This invention relates to a method for determining at high speed coordinate values of continuous and sequential dots in a quantized two-dimensional coordinate system.

2. Description of the Prior Art

It has conventionally and frequently been carried out, as basic processing in drafting and the like, to prepare line segments on the basis of their corresponding desired two points in quantized two-dimensional coordinate systems. However, its processing speed tends in many instances to develop problems in performing such processing through software by means of computers or the like.

SUMMARY OF THE INVENTION

The present invention has made it possible to perform high-speed processing of such line segment coordinates without developing any substantial errors by effecting a part of the above-mentioned processing with the aid of hardware.

Conventionally, sequential dots connecting two points have been calculated from the coordinate values $(x_1, y_1)$, $(x_2, y_2)$ of the two points by determining the slope $\theta$ of the line connecting the two points as:

$$\theta = \tan^{-1} \frac{y_2 - y_1}{x_2 - x_1} \tag{1}$$

and obtaining, on the basis of the slope, the value of $y_n$ corresponding to $x_n$ on the line segment as:

$$y_n = y_1 + (x_n - x_1)\tan\Theta \tag{2}$$

Alternatively, the value of $y_n$ may be determined as will be given right below, by obtaining the increment $\Delta y$ of $y$ per $\Delta x$ from the two points and then adding the product of $\Delta y \times (n-1)$ to the initial value $y_1$.

$$y_n = y_1 + (n - 1)\frac{y_2 - y_1}{x_2 - x_1} \tag{3}$$

The software operation of determining $(y_2 - y_1)/(x_2 - x_1)$ from the equations (1) and (2) or the equation (3) requires performance of high-accuracy division in the case of a long line segment, thereby requiring long operation time and hence making the overall processing time longer.

If the calculation accuracy of $(y_2 - y_1)/(x_2 - x_1)$ is sacrificed to shorten the operation time, errors which occur in the course of calculation of $(y_2 - y_1)/(x_2 - x_1)$ are accumulated, thereby failing to connect the two points in some instances.

With the foregoing in view, the present invention has enabled performance of error-free and high accuracy operation and, at the same time, shortened operation time by carrying out parts of the operations by means of hardware.

In one aspect of this invention, there is thus provided a method for processing at high speed line segment coordinates to determine the coordinate values of quantized sequential dots on a line segment connecting two desired points $(x_1, y_1)$, $(x_2, y_2)$ in a two-dimensional quantized coordinate system, which method comprises:

providing counters, each of which employs one quantum unit as the reference clock signal thereof, respectively with the x-axis and y-axis;

controlling reference clock signals, which are to be input to the counters, in accordance with the information on the two points $(x_1, y_1)$, $(x_2, y_2)$; and employing output values of the counters as coordinate values of the quantized sequential dots.

The above processing method of this invention can be performed at a high speed, thereby bringing about a great advantage from the practical viewpoint.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIG. 6 is a table showing outputs at various time points from a variety of blocks depicted in FIG. 5;

FIG. 8 is a table showing outputs at various time points from a variety of blocks depicted in FIG. 7; and FIGS. 9a and 9b illustrate quantized diagrams.

DETAILED DESCRIPTION OF THE INVENTION AND PREFERRED EMBODIMENTS

First of all, the principle of this invention will be described with reference to FIG. 1.

Figure 1:
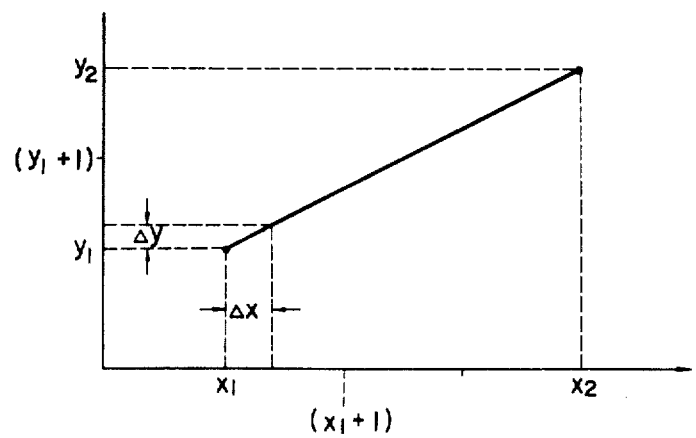
FIG. 1 is a a coordinate diagram showing desired two points.

In FIG. 1, let's now select a line segment which connects desired two points $(x_1, y_1)$, $(x_2, y_2)$. This line segment can be expressed by the equation (4):

$$y = \frac{y_2 - y_1}{x_2 - x_1}(x - x_1) + y_1 \tag{4}$$

Here, the desired point $(x_1, y_1)$ is to be converted for the simplification of the equation to a coordinate system the original of which is at (0,0). The equation (4) is thus written as follow:

$$y = \frac{y_2'}{x_2'} x \tag{5}$$

Supposing now that the pitch of the x-axis be $\Delta x$, the equation (5) can be rewritten as:

$$y_n = \frac{y_2'}{x_2'} \cdot m \cdot x \tag{6}$$

In the equation (6), m is a positive integer.

Let's now suppose that $\Delta x = 1/y_2'$. Then, $x_n$ may be expressed by the following equation.

$$x_n = m \cdot x = m \cdot \frac{1}{y_2'} \quad (7)$$

Since $x_n$ is a desired coordinate value (integer) present between $x_1$ and $x_2$ and to be quantized, the value which m can take is only the multiplication product of $y_2'$ by an integer. This is true, because $x_n$ is an integer and the equation (7) can be expressed by the following equation.

$$m = x_n \cdot y_2' \quad (8)$$

From the above relationship, the equation (6) may be rewritten to the following equation.

$$y_n = \frac{y_2'}{x_2'} \cdot m \cdot \Delta x = \frac{y_2'}{x_2'} \cdot m \cdot \frac{1}{y_2'} = \frac{m}{x_2'} \quad (9)$$

From the equations (7) and (9), coordinates on the line segment connecting the two points (0,0), $(x_2', y_2')$ are:

$$(x_n, y_n) = \left( \frac{m}{y_2'}, \frac{m}{x_2'} \right) \quad (10)$$

On the basis of the equation (10), quantized coordinates represented by the equation (5) are as follows:

$$\begin{aligned}
&\text{When } m_{0x} = 0 \times y_2', (0,0); \\
&\text{When } m_{0y} = 0 \times x_2', (0,0) \\
&\text{When } m_{1x} = 1 \times y_2', \left( 1 \frac{y_2'}{x_2'} \right); \\
&\text{When } m_{1y} = 1 \times x_2', \left( \frac{x_2'}{y_2'}, 1 \right) \\
&\text{When } m_{2x} = 2 \times y_2', \left( 2, 2\frac{y_2'}{x_2'} \right) \\
&\text{When } m_{2y} = 2 \times x_2', \left( 2\frac{x_2'}{y_2'}, 2 \right) \\
&\text{When } m_{nx} = n \times y_2', \left( n_x, n_x \frac{y_2'}{x_2'} \right) \\
&\text{When } m_{ny} = n_y \times x_2', \left( n_y \frac{x_2'}{y_2'}, n_y \right)
\end{aligned} \quad (11)$$

Quantized integers are to be obtained respectively as the values $x_n, y_n$. When either one of the values $x_n, y_n$ is an integer, the other value therefore takes an integer obtained by rounding the resulting value, namely, by cutting away fractions smaller than decimal point, counting fractions of 0.5 and over as 1 and cutting away the rest, or raising fractions smaller than decimal point to 1. Coordinate values quantized in the above manner with respect to sequential dots on a line segment do not contain any substantially errors.

Figure 2:
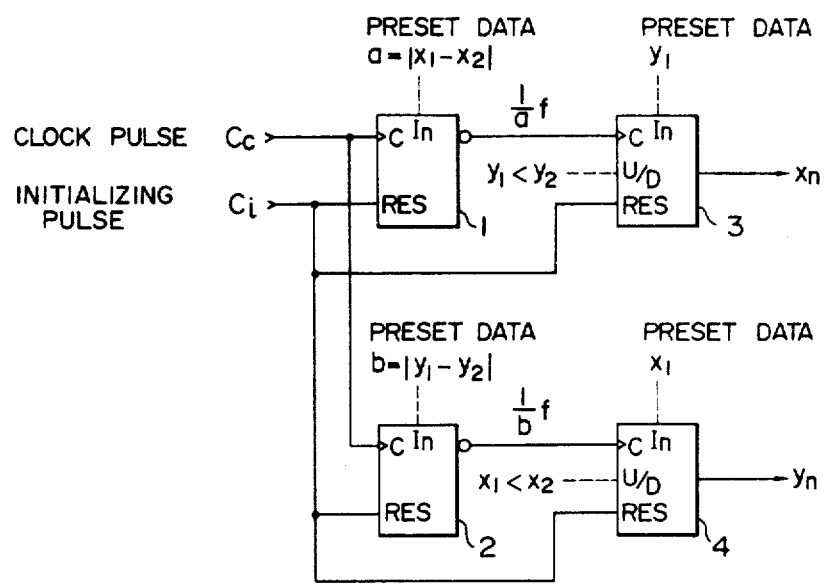
FIG. 2 is a circuit diagram illustrating one embodiment of this invention.

One embodiment of this invention, which embodiment has been conceived in accordance with the above concept, is illustrated in FIG. 2.

In FIG. 2, the frequency f of a clock $C_c$ is used in place of m. In addition, frequency division counters 1,2 are employed to perform $$\frac{1}{|x_1 - x_2|} \text{ and } \frac{1}{|y_1 - y_2|}$$

and up-down counters 3,4 are used to indicate results in absolute values.

In this embodiment, counters are used. Therefore, it is only possible to obtain the values $x_n, y_n$ as clock numbers which are integer-multiplications of $y_2'$ or $x_2'$.

Figure 5:
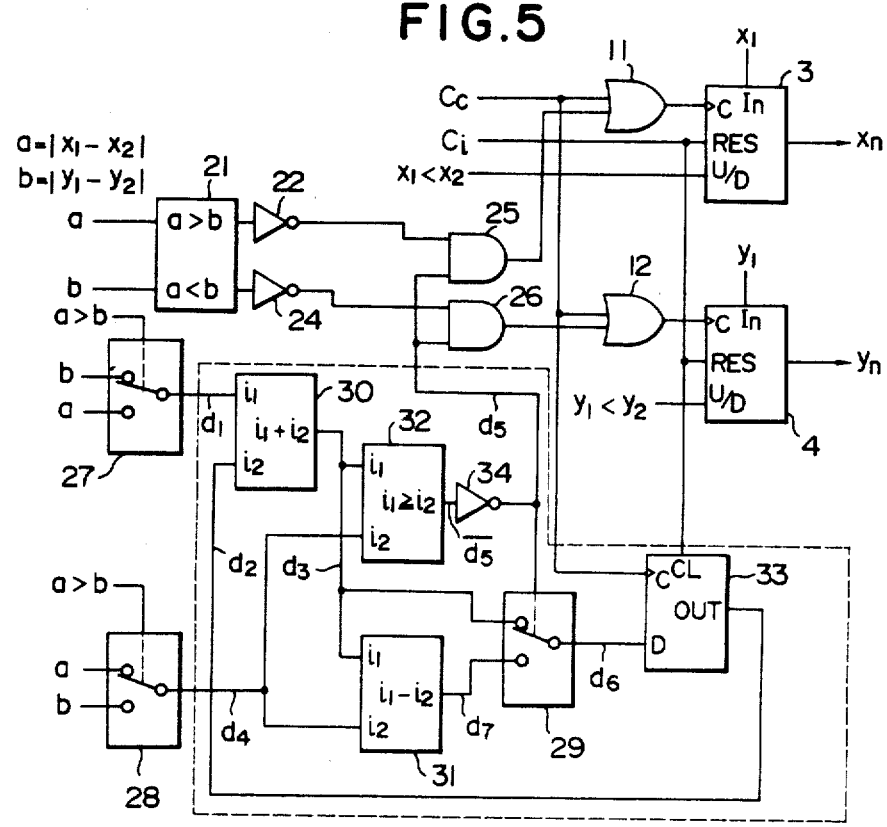
FIG. 5 is a circuit diagram showing another embodiment of this invention.

Another embodiment is illustrated in FIG. 5, in which the frequency demultipliers have been substituted by adders, subtractors, etc, whereby making it possible to perform the counting (division) of $y_2'$ or $x_2'$ at once. This embodiment has materialized faster processing operations.

The embodiment of FIG. 2 will hereinafter be described in detail. Numerals 1,2 indicate frequency division counters respectively, whereas presettable up-down counters are designated at numerals 3,4 respectively.

The frequency division counters 1,2 serve respectively as frequency division counters of a 1/a and 1/b on the basis of the coordinate differences $|x_1 - x_2|$ and $|y_1 - y_2|$ between two points which are to be present in advance. Each output of the frequency division counter 1 is to be used as a clock signal $C_a$ of (1/a)f. The counter 3 is preset to $y_1$ by the initial pulse $C_i$ and counts clock signals $C_a$ of a (1/a)f. When $y_1 > y_2$, the counter 3 operates as a down counter in accordance with signals output from means which suitably discriminates $y_1 > y_2$. When $y_1 < y_2$, the counter 3 operates as an up counter in the same manner.

The counter 4 is to be preset to $x_1$, as presetting data, by the initial pulse $C_i$. The counter 4 is adapted to count clock signals $C_b$, each of which has a frequency of (1/b)f, to be output from the frequency division counter 2. Similar to the above-described counter 3, the counter 4 serves as a down counter when $x_1 > x_2$ but operates as an up counter when $x_1 < x_2$.

Output values of the counters 3,4 are obtained with the timing of the larger one in frequency of the clock signals $C_a$ and $C_c$ the frequencies of which are respectively (1/a)f and (1/b)f.

In FIG. 2, the relation in relative value between $x_1$ and $x_2$ and that between $y_1$ and $y_2$ as well as the positive or negative symbols and values of $x_1 - x_2$ and $y_1 - y_2$ and the relation in relative absolute value between $x_1 - x_2$ and $y_1 - y_2$ may be input by means of signals processed through software of a computer or the like or by like means. They are indicated by dashed input lines.

Supposing for the sake of facilitating the understanding that $x_1 < x_2$, $x_2 - x_1 = a$, $y_1 < y_2$, $y_2 - y_1 = b$, $a > b$, $a = 4$ and $b = 3$, a further description will be made with reference to FIG. 3.

By the initial pulse $C_i$, the dividing values of the frequency division counters 1,2 are respectively set to $a = 4$ and $b = 3$. They output frequencies (1/a)f and (1/b)f, corresponding to their respective setting values. Thus, the clock signals $C_a, C_b$ having frequencies of (1/a)f and (1/b)f serve as input clock signals for the counters 3,4. Therefore, the counters 3,4 are adapted to count their corresponding clock signals $C_a, C_b$. The counts of the counters 3,4 are indicated respectively as $y_n$ and $x_n$.

When the reading is performed by clock signals the frequency of each of which is (1/b)f, the read out clock signals 1 , 2 , 3 and 4 give quantized values which are slightly different from one another. This outcome is illustrated in FIG. 4.

In a special case such as $x_1=x_2$, $y_1=y_2$ or $|x_1-x_2|=|y_1-y_2|$, the processing is performed separately by the software of a computer or the like. Software may also be used to perform processing when the counters 3,4 have reached their respective preset count levels.

As a modification of the embodiment of FIG. 2, it may be feasible to input clock signals $C_c$ having a frequency f directly to the counter 4 and, to the counter 3, to multiply the frequency f of the clock signal $C_c$ with b by a synthesizer to obtain bf, to divide bf with 1/a by a frequency demultiplier to obtain a frequency (b/a)f and then to input the frequency there. This modification is meritorious in that the reading can be performed in synchronization with clock signals $C_c$ of the frequency f.

As the dividing value b or a becomes greater in FIG. 2, the frequency of each input clock signal of the counters 3,4 decreases. As a result, the one quantum processing time becomes longer and its application range is thus limited.

FIG. 5 illustrates the second embodiment of this invention, which permits to perform arithmetic operations at a still faster speed.

OR gates 11,12 operate as gates for clock signals $C_c$ to be input to the counters 3,4. Supposing now that the dividing value a is greater than the dividing value b (a>b), a comparator 21 outputs a signal "H". The signal "H" is converted to "L" by means of a NOT circuit 22. Thereafter, the signal "L" enters an AND gate 25, which output the signal "L". By the signal "L", an OR gate is kept open to permit the counter 3 to count whenever it receives the pulse of each clock signal $C_c$ having the frequency f.

When a<b on the other hand, the comparator 21 outputs a signal "L", which is then converted to a signal "H" by means of a NOT circuit 24. The resulting signal "H" then enters an AND gate 26. Depending whether the output of the NOT circuit is "H" or "L", the output signal of the AND gate 26 becomes "H" or "L". The output signal of the AND gate 26 enters the OR gate. When the output signal is "H", the OR gate 12 is closed and the counter 4 does not count even when clock signals $C_c$ are input. When the output signal is "L" on the contrary, the output signal "L" opens the OR gate 12, thereby allowing the counter 4 to count clock signals $C_c$.

Namely, the counter 3 performs the counting by the pulse of every clock signal $C_c$ when a>b, while the counter 4 does not count even when clock signals $C_c$ are input when the output signal of the NOT circuit is "H" but does count whenever the pulse of each clock signal $C_c$ is input when the output signal of the NOT circuit 24 is "L".

When a<b, the counter 3 does not count clock signals $C_c$ when the output signal of the NOT circuit is "H" but does count the pulse of each clock signal $C_c$ when the output signal of the NOT circuit is "L". However, the counter 4 counts the pulse of each clock signal $C_c$.

Next, a lower part (which is surrounded by dotted lines) of the circuit shown in FIG. 5 will be described.

When a>b, the values b,a of the preset data are respectively selected as outputs $d_1,d_4$ of selectors 27,28. First of all, a D-flip-flop (D-FF) 33 is cleared by the initial pulse $C_i$ and the output of the D-FF 33 is input as "0" to an adder 30.

An output $d_3$ of the adder 30 is in turn input to a comparator 32 and subtractor 31. The output $\bar{d}_5'$ of the comparator 32, which output may be either a signal "H" or a signal "L", is converted to an output $d_5$ by means of a NOT circuit 34 and the resulting output $d_5$ is fed to the AND gates 25,26 and the gate-input terminal of a selector 29.

As described above, the AND gates 25,26 control clock signals to the counters 3,4 in accordance with the output $d_5$ which is obtained by processing the output of the comparator 32 through the NOT circuit 34. The selector 29 inputs the output (operation result) $d_3$ or $d_4$ of the adder 30 or subtractor 31 selectively to the D-FF 33 in accordance with the output $d_5$ of the NOT circuit 34. The D-FF 33 receives input data during the rise time of each clock signal $C_c$ and then keeps the thus-received input data for output.

Figure 3:
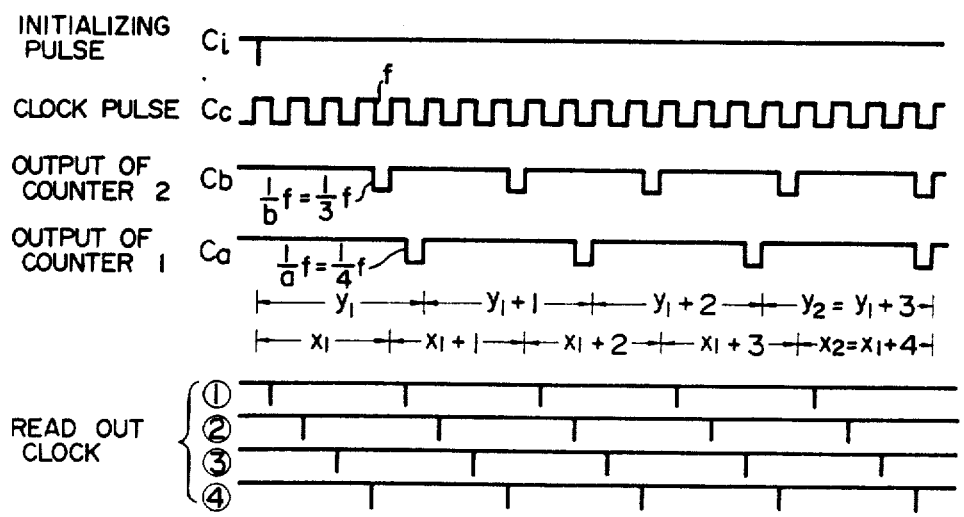
FIG. 3 is a timing chart.

As the clock signal $C_c$, it is preferred to employ such an "L" trigger clock as the read out pulses 1 - 4 shown in FIG. 3 as OR circuits are used as the gates 11,12, so that the counters 3,4 are not actuated by output variations of the AND gates 25,26.

In order to facilitate the understanding, the operation of the circuit of FIG. 5 will hereinafter be described using specific values as a and b, i.e., supposing a=4 and b=3.

The output signal from the a>b side of the comparator 21 becomes "H" and the counter 3 counts the pulse of each clock signal $C_c$ as explained above. At this time, the output signal from the a<b side of the comparator 21 becomes "L" and the pulse of each clock signal $C_c$ for the counter 4 is accordingly controlled by the manner of outputs from the comparator 32.

FIG. 6 shows the value of each clock pulse in each block. Variations of clock pulse values will next be described.

Presetting data are set in the counters 3,4 by the initial pulse $C_i$. The output values of the counters 3,4 are respectively $x_1,y_1$, nad the output value $d_2$ of the D-FF 33 is turned to "0". The output value $d_1$ of the selector 27 is "3", whereas the output value $d_3$ of the adder 30 is "3". On the other hand, the output value $d_4$ of the selector 28 is "4", and the output signals $\bar{d}_5$ and $d_5$ of the comparator 32 and NOT circuit 34 are "L" and "H" respectively. Therefore, the counter 4 is unable to perform any counting operation.

The output value $d_7$ of the subtractor 31 is "−1". Since the output signal $d_5$ of the NOT circuit 34 is "H", the selector 29 chooses the output value $d_3$ of the adder 30, namely "3". Thus, "3" is fed as the input value $d_6$ to the D-FF 33. This state is fixedly maintained until the first clock pulse comes subsequent to the output of the initial pulse $C_i$.

When the first clock pulse has next come, the value of the counter 3 becomes $x_1+1$ whereas the value of the counter 4 remains at $y_1$. Here, the output value $d_2$ of the D-FF 33 is "3". On the other hand, the output value $d_3$ of the adder 30 is "6", the output signal $\bar{d}_5$ of the comparator 32 (supposing that $d_3 \geq d_4$ be true) is "H", the output signal $d_5$ of the NOT circuit 34 is "L" and the output value $d_7$ of the subtractor 31 upon performing the $d_3-d_4$ is "2". Thus, the selector 29 chooses the subtraction result, namely, the output value $d_7$, whereby feeding "2" as the input value $d_6$ to the D-FF 33.

When the second clock pulse has then come, the value of the counter 3 reaches $x_1+2$ and the calculation value of the counter 4 becomes $y_1+1$ because the output signal $d_5$ of the NOT circuit 34 is "L" and the counter 4 is thus ready to count.

Here, the output value $d_2$ of the D-FF 33 is "2", the output value $d_3$ of the adder 30 is "5", the output signal $d_5$ of the NOT circuit 34 is "L", and the output value $d_7$ of the subtractor 31 becomes "1" as a result of the subtraction $d_3-d_4$. Then, the selector 29 chooses the subtraction result $d_7$, thereby feeding "1" as the input value $d_6$ to the D-FF 33.

When the third clock pulse has come, the value of the counter 3 changes to $x_1+3$ and the value of the counter 4 reaches $y_1+2$.

At this time, the output value $d_6$ of the D-FF 33 is "1", the output value $d_3$ of the adder 30 is "4", the output signal $d_5$ of the NOT circuit 34 is "L", and the output value $d_7$ of the subtractor 31 is "0". Thus, the selector 29 chooses the subtraction result $d_7$, resulting in the feeding of "0" as the input value $d_6$ to the D-FF 33.

When the fourth clock pulse has come, the values of the counters 3,4 are turned to $x_1+4=x_2$ and $y_1+3=y_2$ respectively. As a result, similar to the above operations, the output value $d_2$ of the D-FF 33 is "0", the output value $d_3$ of the adder 30 is "3", the output signal of the NOT circuit 34 is "H", the output value of the subtractor 31 is "$-1$" as a result of the subtraction of $d_3-d_4$. The selector 29 chooses the addition result $d_3$, thereby feeding "3" as the input value $d_6$ to the D-FF 33.

Therefore, the above operation results are $(x_1,y_1)$, $(x_1+1,\ y_1)$, $(x_1+2,\ y_1+1)$, $(x_1+3,\ y_1+2)$, and $(x_1+4=x_2,\ y_1+3=y_2)$, which coincide with the embodiment depicted in FIG. 2. The quantized state is the same as that illustrated in FIG. 4(a).

In FIG. 5, preset signals are processed by the software of a computer or the like as indicated by the dashed signal-feeding lines in FIG. 2 and explained above with reference to the same drawing.

Figure 7:
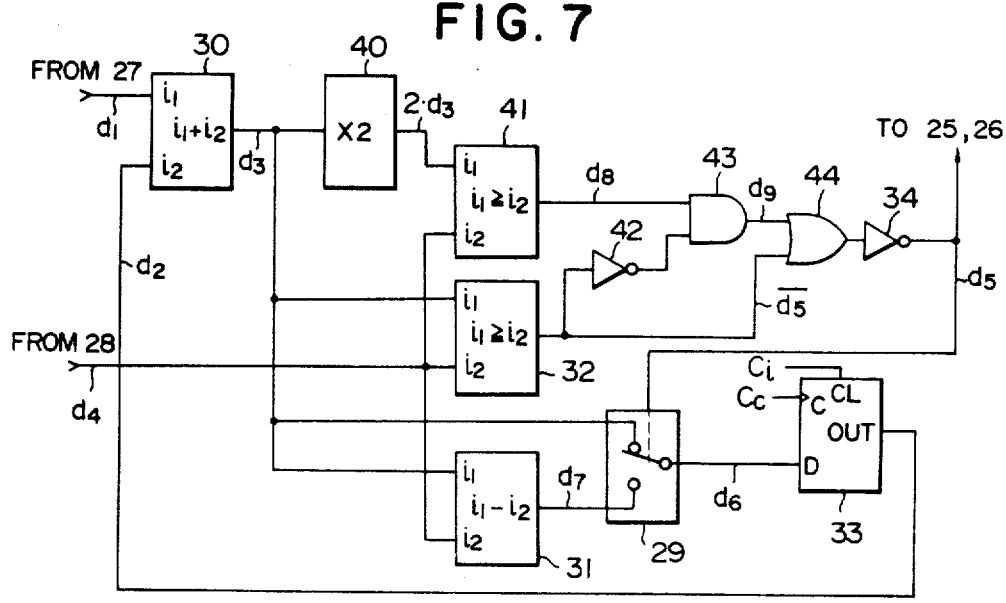
FIG. 7 is a circuit diagram showing a further embodiment of this invention.

As a result of the embodiment of FIG. 5, the quantization is performed when the result is either greater than or equal to the one quantum unit. The quantization can be performed more carefully and precisely by counting fractions of 0.5 and over as 1 and cutting away the rest. This quantization method is illustrated in FIG. 7. The circuit of FIG. 7 can be substituted for the lower left part (i.e., that surrounded by the dashed lines) in FIG. 5.

FIG. 7 is a circuit diagram of a further embodiment which permits to count fractions of 0.5 and over as 1 and to cut away the rest. The further embodiment of FIG. 7 includes, in addition to the embodiment of FIG. 5, a doubler 40, adder 41, NOT circuit 42, AND gate 43 and OR gate 44. Similar to the case illustrated in FIG. 6, FIG. 8 shows values of various blocks after initializing by the initial pulse $C_i$ and after feeding N-th clock signal. In FIG. 8, the values a and b are supposed to be $a=4$ and $b=3$. The results shown in FIG. 8 correspond to the state depicted in FIG. 4(c).

Figure 4A:
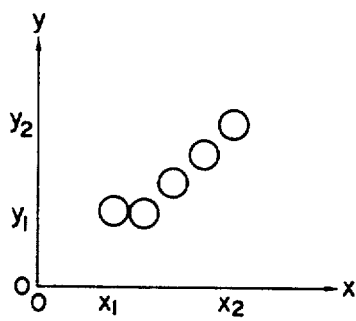
FIGS. 4a, 4b, 4c and 4d illustrate quantized diagrams.
Figure 4B:
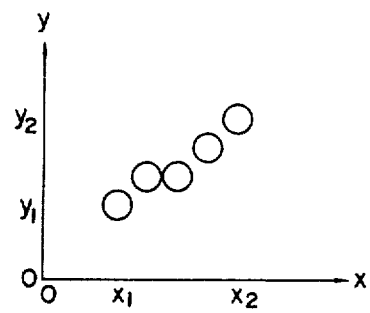
Figure 4C:
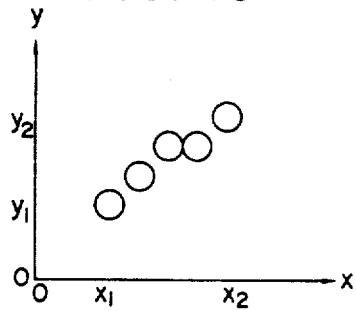
Figure 4D:
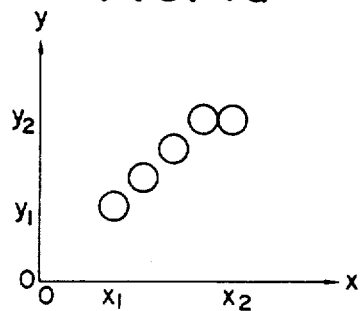

In order to make the results shown in FIG. 8 identical to the results depicted in FIG. 4(b), it is necessary to set the comparison conditions of a comparator 41 as $i_1 > i_2$ so as to achieve $2 \cdot d_3 > d_4$. The doubler 40 is only required to add 1 bit of input digital signals $d_3$ to the lowermost bit so that the digital signals $d_3$ are input to the comparator 41 after the effective bits of $d_3$ have been shifted by one bit upwardly.

The embodiment of FIG. 7 shows a distinct difference from that of FIG. 5 when the ratio of a to b is 1, namely, $(a/b)=1$.

FIG. 9 illustrates one example of quantization, in which $a=10$ and $b=1$. FIG. 9(a) corresponds to the embodiment illustrated in FIG. 5, whereas FIG. 9(b) corresponds to the embodiment depicted in FIG. 7. It will be understood that the embodiment of FIG. 7 can perform more natural approximation.

Under such special conditions as $x_1=x_2$, $y_1=y_2$, $|x_1-x_2|=|y_1-y_2|$ and the like, the quantization can be readily carried out by means of hardware. Therefore, quantization under such special conditions are not described herein. Needless to say, it may be performed by the software of a computer or the like.

The present invention which may be used for drafting work or the like uses a quantized value of $40,000 \times 40,000$.

To determine the slope of the equation (1) or (3), the conventional software-processing time was 10 μsec.–20 μsec. with an accuracy of 16 bits and 40 μsec.–500 μsec. with an accuracy of 32 bits. Since 3–5 μsec. are required for each quantum, it is necessary to spend 10 μsec.–500 μsec.+3–5 μsec. × 10,000 ≈ 30,000 μsec. – 50,000 μsec. (0.3 sec.–0.5 sec.) when 10,000 quantization operations are required.

When the software-processing is carried out using the hardware of FIG. 5, it is necessary to spend 15 μsec.–20 μsec for every quantum (i.e., 15 μsec.–20 μsec. × 10,000 = 1.5–2.0 sec.)

On the other hand, the hardware of FIG. 7 takes 0.05 μsec.–0.2 μsec. for each quantum (i.e., 0.05 μsec.–0.2 μsec. × 10,000 = 500 μsec. – 2,000 μsec.). Therefore, the processing time is shortened to $$\frac{1}{\text{several 10s}} - \frac{1}{100}.$$

In actual operations, these processings are required many times. Thus, the time saving becomes more remarkable in the case of the entire processing process. Accordingly, the method of this invention can bring about a great value when applied.

Having now fully described the invention, it will be apparent to one of ordinary skill in the art that many changes and modifications can be made thereto without departing from the spirit or scope of the invention as set forth herein.

What is claimed is:

1. A method for processing at high speed line segment coordinates to determine the coordinate values of quantized sequential dots on a line segment connecting desired two points $(x_1,y_1)$, $(x_2,y_2)$ in a two-dimensional quantized coordinate system, which method comprises:

providing counters, each of which employs one quantum unit as the reference clock signal thereof, respectively with the x-axis and y-axis;

controlling reference clock signals, which are to be input to the counters, in accordance with the information on the two points $(x_1,y_1)$, $(x_2,y_2)$; and employing output values of the counters as coordinate values of the quantized sequential dots.

2. A method as claimed in claim 1, wherein the reference clock signal of one quantum unit is set in such a way that the reference clock signal conforms with the inverse ratios of the differences $|x_1-x_2|$, $|y_1-y_2|$ between the desired two points $(x_1,y_1),(x_2,y_2)$ on the x-axis and y-axis, and resulting reference clock signals are input to the counters for the x-axis and y-axis.

3. A method as claimed in claim 1, wherein the generation of the reference clock signal of the one quantum unit is controlled by at least one of addition, subtraction and relative value discrimination, of the differences $|x_1-x_2|$, $|y_1-y_2|$ between the desired two points $(x_1,y_1)$, $(x_2,y_2)$ on the x-axis and y-axis.

* * * * *